Figure 1:
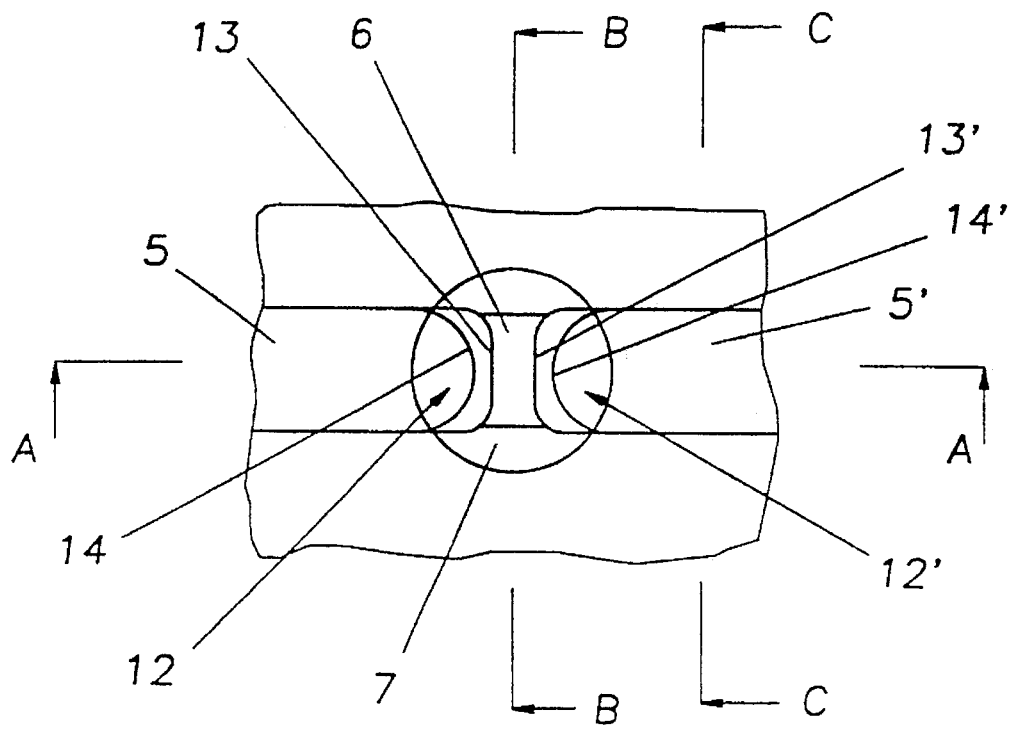

United States Patent [19]

Hansson et al.

[11] Patent Number: 5,593,130
[45] Date of Patent: Jan. 14, 1997

[54] VALVE, ESPECIALLY FOR FLUID HANDLING BODIES WITH MICROFLOWCHANNELS

[75] Inventors: Thord Hansson, Bälinge; Stefan Sjölander, Uppsala, both of Sweden

[73] Assignee: Pharmacia Biosensor AB, Uppsala, Sweden

[21] Appl. No.: 605,166

[22] PCT Filed: Sep. 6, 1994

[86] PCT No.: PCT/SE94/00824

§ 371 Date: Mar. 6, 1996

§ 102(e) Date: Mar. 6, 1996

[87] PCT Pub. No.: WO95/07425

PCT Pub. Date: Mar. 16, 1995

[30] Foreign Application Priority Data

Jun. 9, 1993 [SE] Sweden .................................. 9302865

[51] Int. Cl.[6] ...................................... F16K 7/12
[52] U.S. Cl. ........................... 251/61.1; 251/331; 251/359
[58] Field of Search ............................ 251/61.1, 331, 251/359, 364

[56] References Cited

U.S. PATENT DOCUMENTS 4,304,257 12/1981 Webster .
4,848,722 7/1989 Webster .
4,852,851 8/1989 Webster .
5,203,368 4/1993 Barstow et al. ................... 251/61.1 X
5,313,264 5/1994 Ivarsson et al. .
5,496,009 3/1996 Farrell et al. ........................ 251/61.1

*Primary Examiner*—Kevin Lee
*Attorney, Agent, or Firm*—Birch, Stewart, Kolasch & Birch, LLP

[57] ABSTRACT

A valve of the membrane valve type comprises a valve body with two fluid flow channels (5, 5') separated by a land portion which forms a valve seat (6) having a sealing surface for co-operation with a flexible membrane (7) mounted over a duct (8) which opens in front of the valve seat and is arranged for fluid pressure actuation of the membrane between a closing position, where the membrane (7) sealingly contacts the valve seat (6), and an opening position where there is a flow channel communicating space (11) between the valve seat (6) and the membrane (7). The valve is characterized in that the sealing surface of the valve seat (6) comprises (i) a primary sealing surface (10) located nearest and facing the membrane, and (ii) a secondary sealing surface (12, 12') provided on each fluid channel side of the valve seat, so that when the valve is closing, the membrane (7) successively seals against the primary sealing surface (10) and the secondary sealing surfaces (12, 12'), and, inversely, when the valve is opening, the member (7) is successively separated from the secondary sealing surfaces (12, 12') and the primary sealing surface (10).

11 Claims, 2 Drawing Sheets

VALVE, ESPECIALLY FOR FLUID HANDLING BODIES WITH MICROFLOWCHANNELS

The present invention relates to a valve of the type that employs a flexible membrane to close or open the valve, particularly a valve that is included in fluid networks for handling various types of fluids, gaseous as well as liquid.

A known type of membrane valve consists of a valve body and a flexible membrane. Two liquid flow channels formed in the surface of the valve body are separated by a land portion, or valve seat, having a contact surface for the membrane, which can be actuated so that the membrane surface in a first position sealingly contacts the land portion to block the flow between the two channels, and in a second position is spaced from the land portion to allow liquid flow between the channels.

In U.S. Pat. No. 4,304,257 the land portion is flat and coincident with the rest of the surface of the valve body, and the membrane is flexed mechanically between the two positions by means of a solenoid operated rod member attached to the membrane, and more particularly such that the membrane in the state of rest contacts the land portion and to open the valve is pulled downwardly into an aperture below the membrane.

This valve has several disadvantages. In addition to the mechanical solenoid operation of the membrane being relatively complicated and requiring sensitive adjustment, the membrane is subjected to great stresses with the risk of permanent stretch. Further, liquid flow through the valve does not take place directly when the membrane is withdrawn from the land portion, but the void formed must first be filled with liquid, which causes a prolonged valve opening time.

Developments of the above described valve where several of the mentioned drawbacks are overcome are described in U.S. Pat. Nos. 4,848,722, 4,852,851 and 4,858,883. First of all, the mechanical actuation of the membrane is replaced by a considerably simpler pneumatic actuation in all these valve constructions.

Further, in the construction according to U.S. Pat. No. 4,848,722, the land portion is replaced by a spherically concave recess in the valve body, in which recess the two flow channels terminate. By virtue of such a concave contact surface for the membrane, the sealing area is maximised and the stresses on the membrane are reduced as membrane wrinkles and sharp membrane bends are avoided. The enlarged contact area is, however, disadvantageous in that it makes the valve opening slower.

The valve construction according to U.S. Pat. No. 4,858,883 is therefore provided with a groove or a channel in the bottom of the concave recess, which channel in the closed position of the valve is also sealed by the membrane, but which when the valve is opening is rapidly uncovered by the membrane to connect the two flow channels so that liquid flow is allowed almost immediately and before a larger gap or void has been created between the membrane and the valve seat. Hereby, the response time of the valve is reduced to a considerable extent.

U.S. Pat. No. 4,852,851 describes a similar construction in which, however, a reduced continuous flow is maintained through the valve by means of a flow through channel formed in the concave surface and having such a depth that it can not be sealed by the membrane.

The present invention relates to a further improved valve construction of the above-mentioned type which provides for better sealing with low actuating pressure, quicker valve opening and valve closing, more reproducible control of the valve position states, and minimised material fatigue of the valve membrane as well as of the valve seat.

According to a basic concept of the invention, this is accomplished by a membrane valve of the mentioned pneumatic type where the valve seat surface is divided into a, preferably smaller, primary sealing surface, or top sealing surface, and a, preferably larger, secondary sealing surface, so that opening and closing, respectively, of the valve takes place in two steps, and more particularly such that when the valve is closing, the membrane first rapidly seals against the top sealing surface, and then provides further ensured sealing by contact with the (preferably enlarged) secondary sealing surface, while inversely, when the valve is opening, the membrane is first separated from the (preferably larger) secondary sealing surface and is then substantially momentarily separated from the top sealing surface.

Such a valve has the features given in claim 1. Advantageous embodiments are defined in the subclaims.

Figure 2:
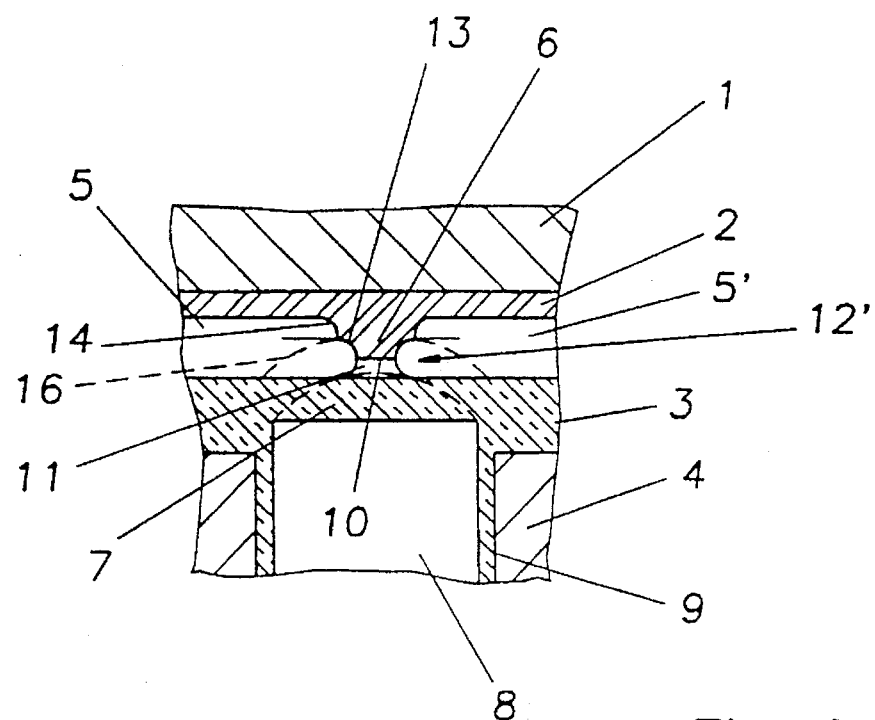
Figure 3:
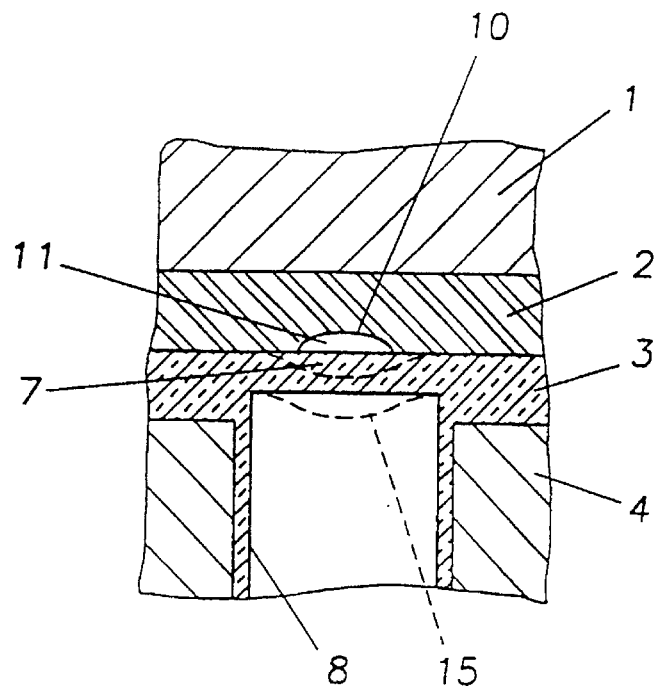
Figure 4:
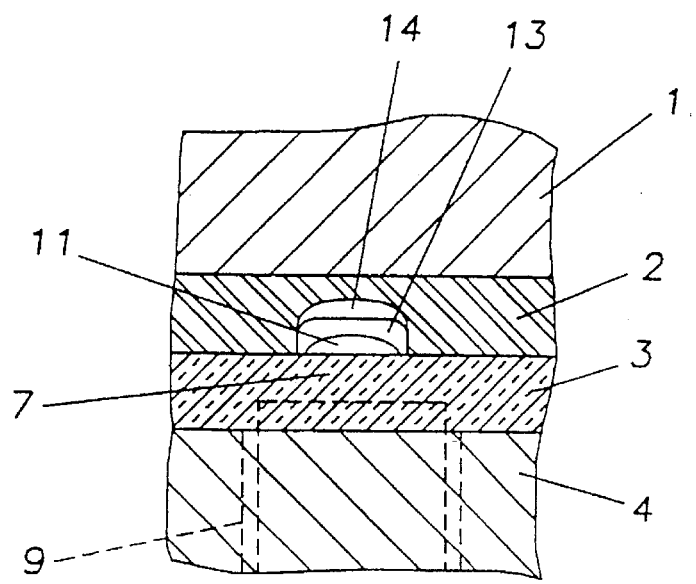

In the following, the invention will be described in more detail with regard to a non-limiting embodiment thereof, reference being made to the accompanying drawings, where FIG. 1 shows a transparent top plan view of the valve, FIG. 2 shows a longitudinal section along A—A in FIG. 1 of the valve in its opening state and closing state, respectively, FIG. 3 shows a cross-section along B—B in FIG. 1, and FIG. 4 shows a cross-section along C—C in FIG. 1.

The valve construction illustrated in FIGS. 1 to 4 is designed to be integratable into a fluid handling block comprising several such valves and microfluidic channels, e.g. a fluid handling block of the type that is included in the optical biosensor system described in U.S. Pat. No. 5,313,264.

The fluid handling block is essentially constructed from an upper support plate 1, a first, harder (say about 75° shore A) elastomeric layer 2, e.g. silicone rubber, a second, softer (say about 30° shore A) elastomeric layer 3, e.g. also silicone rubber, and a lower support plate 4. The first elastomeric layer has the appropriate flow channel system formed therein so that flow channels 5, 5' are defined between the first elastomeric layer 2 and the second elastomeric layer 3.

Each valve in this block construction is constituted by a land portion, or valve seat, 6 formed in the first elastomeric layer 2 between two flow channels 5, 5', and an opposed portion of the second elastomeric layer 3 mounted over a cylindrical pressure duct 8 connected to a source of compressed air (not shown), the elastomeric layer 3 here being thinned to form a flexible valve membrane or diaphragm 7. In the illustrated case, the pressure duct 8 is formed in a part of the elastomeric layer that extends downwardly into a recess 9 made in the lower support plate 4. The pressure duct portion 10 is filled with a short liquid column (not shown), e.g. glycerol, the function of which will be described below.

The valve seat 6 protruding from the flow channel wall extends with its extreme part almost up to the valve membrane 7 (in its unloaded position) and exhibits a contact surface 10 for the membrane 7 with a concave (in the case illustrated in the figure elliptic-cylindrical) profile across the flow channels, as is best shown in Figs. 3 and 4. This contact surface or area 10 is in the following called top sealing surface and defines a flow channel 11 between itself and the membrane 7. The profile of the top sealing surface 10 should have a different curvature than that obtained by the membrane 7 when affected by actuating pressure for the reasons presented below.

On each side of the top sealing surface 10 (as seen in the flow channel direction), the valve seat 6 has a lower located secondary sealing surface or area 12 and 12', respectively, for the membrane 7 with a sharply angled transition from the top sealing surface. Viewed sideways, each one of these two secondary sealing surfaces 12, 12' is in the illustrated case (see particularly FIGS. 1 and 2) arranged in the form of two different concave "steps", an upper step 13, 13' (nearest the top sealing surface 10) and a lower step 14, 14', with a sharply angled transition between the two steps. Altogether, the relatively thin, flexible valve seat 6 thus exhibits a well defined total sealing area.

The function of the valve will now be described. In the open position of the valve, no gas pressure is applied to the pressure duct 8, and fluid, usually liquid (but may also be gas) flows through the valve between the flow channels 5, 5' on each side of the valve seat 6 via the flow through channel 11. As indicated by the dashed lines in FIG. 3, the membrane 7 is usually pressed out by the liquid pressure to the position indicated at 15, so that the cross-section of flow through channel 11 becomes a little larger than that existing when the membrane is unloaded (in the Figure, the extent to which the membrane is pressed out is exaggerated for clarity). To close the valve, an actuating pressure of pressure gas, usually compressed air, is applied to the pressure duct 8, which pressure via the above-mentioned (not shown) liquid column therein presses the membrane 7 against the valve seat 6. Due to the liquid column, compressed air is prevented from penetrating the membrane 7 and causing undesired air bubbles in the channels 5, 5'.

The membrane 7 is stretched by the momentarily applied actuating pressure until it first meets the top sealing surface 10. Due to the relatively small surface area of the latter (in the case shown intended to be about 5% of the membrane area), a high membrane/seat contact pressure is obtained even at a relatively low membrane overpressure and moderate stretching of the membrane, resulting in quick and reliable blocking of the liquid flow between the channel parts 5, 5'.

The membrane is then stretched further until it meets the larger, lower located step-shaped secondary sealing surface 12, 12', the contact pressure on the valve seat decreasing but still being sufficiently high to provide for reliable valve sealing by the enlarged contact area. This sealing position is indicated in FIG. 2 by the dashed membrane contour 16.

If there were only the small top sealing surface 10, the membrane 7 would be stretched around the latter until the actuating force balanced the seat contact force and membrane elasticity force for each point of the membrane. The membrane 7 would then hang down sharply around the thin valve seat surface 10 with the risk of mechanical wear, deformation or break thereof.

When the valve is opened, the pressure is removed in the pressure duct 8, so that the actuating pressure momentarily decreases to zero. The elasticity force of the stretched membrane 7 in combination with the fluid pressure in the flow channel parts 5, 5' first separate the membrane 7 from the larger, step-shaped sealing surfaces 12, 12' of the valve seat 6, the valve still being kept closed by the contact of the membrane with the top sealing surface 10. Then, the remaining reduced elasticity force of the membrane 7 and the channel fluid pressure separate the membrane substantially momentarily from the considerably smaller top sealing surface 10.

As mentioned above, the profile of the top sealing surface 10 across the flow channels 5, 5' should have a curvature differing from the parabolic profile obtained by the membrane 7 when actuating pressure is applied, so that the centre of the membrane will reach the top sealing surface 10 faster than the side portions of the membrane. This means in turn that the separation of the membrane from the surface 10 also takes place successively, since the membrane is first released from the centre and then from the sides, whereby the separation is facilitated and may take place more rapidly.

The valve opening time is determined by the difference between, on the one hand, the opening forces, i.e. the elasticity (contracting force) of the membrane and the fluid pressure in the channel, and, on the other hand, the closing "adhesive force" resulting when the two elastomer surfaces of the valve seat 6 and the membrane 7 are pressed together. This "adhesive force" as well as the membrane separation time related thereto will be approximately proportional to the contact area of the membrane 7.

By dividing the membrane/seat separation into two steps as above, the separation from the top sealing surface preferably also taking place successively as described above, the valve opening time is reduced, simultaneously as a considerably more reproducible valve opening time is obtained as compared with the case when the whole membrane is separated from the whole valve seat area at the same time, or when an initially opened smaller channel in the seat surface is caused to connect the liquid flow channels as in the known construction according to the above-mentioned U.S. Pat. No. 4,858,883. Due to the lower channel fluid pressure that is required for valve opening, also pressure peaks in the flow start are avoided in contrast to valve constructions where the whole membrane is separated from the valve seat essentially simultaneously. This is due to the fact that it is easier to reproducibly separate two surfaces that stick together from each other if the contact surface is divided into smaller parts which can be separated successively by a smaller force instead of separating the whole area simultaneously by means of a considerably greater force.

It is clear from the description above that a valve designed according to the invention has several advantages compared with the known valve constructions. Firstly, it is possible to use a low actuating pressure and still obtain good sealing with a high contact pressure for the membrane against the valve seat. Further, valve opening and closing are effected rapidly, and the valve position states can be controlled with high reproducibility. Finally, the material fatigue of the valve membrane and the valve seat is minimised, on the one hand, through the "two-step seat construction" and, on the other hand, since both the membrane and the seat are of elastic material.

The invention is, of course, not limited to the embodiment described above and shown in the drawings, but many modifications and changes may be made within the scope of the general inventive concept as defined in the following claims.

We claim:

1. A valve comprising a valve body with two fluid flow channels separated by a land portion which forms a valve seat having a sealing surface for co-operation with a flexible membrane mounted over a duct which opens in front of the valve seat and is arranged for fluid pressure actuation of the membrane between a closed position, where the membrane sealingly contacts the valve seat, and an open position where there is a flow channel communicating space between the valve seat and the membrane, wherein said sealing surface of the valve seat comprises (i) a primary sealing surface located nearest and facing the membrane, and (ii) a secondary sealing surface provided on each fluid channel side of the valve seat, so that when the valve is closing, the membrane successively seals against the primary sealing surface and the secondary sealing surfaces, and, inversely, when the valve is opening, the membrane is successively separated from the secondary sealing surfaces and the primary sealing surface.

2. The valve according to claim 1, wherein the secondary sealing surfaces have a larger membrane contact area than the primary sealing surface.

3. The valve according to claim 1 or 2, wherein the membrane is elastic.

4. The valve according to claim 1 or 2, wherein the valve seat is elastic.

5. The valve according to claim 1 or 2, wherein both the valve seat and the membrane are elastic, the valve seat having a lower elasticity than the membrane.

6. The valve according to claim 1 wherein the duct for fluid pressure actuation of the membrane is arranged to be connected to a source of compressed air.

7. The valve according to claim 1 wherein each secondary sealing surface comprises a step extending in the flow channel direction and spaced from the primary sealing surface.

8. The valve according to claim 7, wherein the valve seat widens in a concave fashion from the primary sealing surface to said steps.

9. The valve according to claim 8, wherein the valve seat widens from said steps in a concave fashion towards the flow channel wall opposite to the membrane.

10. The valve according to claim 1 wherein there is a shape transition between the primary sealing surface and the secondary sealing surfaces.

11. The valve according to claim 1 wherein the primary sealing surface has a concave profile across the flow channels.

* * * * *

UNITED STATES PATENT AND TRADEMARK OFFICE
CERTIFICATE OF CORRECTION

PATENT NO. : 5,593,130
DATED : Jan. 14, 1997
INVENTOR(S) : Thord HANSSON, Stefan SJOLANDER It is certified that error appears in the above-indentified patent and that said Letters Patent is hereby corrected as shown below:

In Section "[30] Foreign Application Priority Data"

change "Jun. 9, 1993" to --Sept. 6, 1993--.

Signed and Sealed this

Sixteenth Day of December, 1997

Attest:

BRUCE LEHMAN

*Attesting Officer*     *Commissioner of Patents and Trademarks*